United States Patent [19]

Harris et al.

[11] Patent Number: 5,328,979
[45] Date of Patent: Jul. 12, 1994

[54] THERMOPLASTIC COPOLYIMIDES AND COMPOSITES THEREFROM

[75] Inventors: Frank Harris; Patricia A. Gabori, both of Akron, Ohio

[73] Assignee: The University of Akron, Akron, Ohio

[21] Appl. No.: 976,484

[22] Filed: Nov. 16, 1992

[51] Int. Cl.$^5$ .................... C08G 69/26; C08G 73/10
[52] U.S. Cl. .................... 528/353; 528/125; 528/128; 528/170; 528/171; 528/172; 528/173; 528/176; 528/183; 528/188; 528/220; 528/224; 528/226; 528/229; 528/350; 528/351; 528/352; 428/357; 428/375; 428/395
[58] Field of Search .............. 528/353, 128, 176, 183, 528/220, 229, 188, 350, 351, 170, 171, 172, 226, 125, 224, 352, 173; 428/357, 375, 395

[56] References Cited

U.S. PATENT DOCUMENTS

| | | | |
|---|---|---|---|
| 4,239,880 | 12/1980 | Darms | 528/185 |
| 4,395,514 | 7/1983 | Edelman | 428/473.5 |
| 4,485,140 | 11/1984 | Gannett | 528/183 |
| 4,578,470 | 3/1986 | Webb | 548/427 |
| 4,851,280 | 7/1989 | Gupta | 428/473.5 |
| 4,914,181 | 4/1990 | Pfeifer | 528/353 |
| 4,914,182 | 4/1990 | Pfeifer | 528/353 |
| 4,963,649 | 10/1990 | Wright | 528/353 |
| 5,112,941 | 5/1992 | Kasai | 528/353 |
| 5,175,242 | 12/1992 | Harris | 528/185 |

*Primary Examiner*—John Kight, III
*Assistant Examiner*—P. Hampton-Hightower
*Attorney, Agent, or Firm*—Oldham, Oldham & Wilson Co.

[57] ABSTRACT

Copolyimide compositions and methods for their preparation which are melt-processible at relative low pressures, i.e. less than 1000 psi, and are suited for laminating and molding, are described. The invention additionally encompasses copolyimide precursors, reinforced polyimide composites and laminates made from said polyimides where the composite is reinforced by fibrous materials. This is achieved by reacting at least one aromatic dianhydride where each anhydride group is located on an aromatic ring with the carbonyl units in an ortho orientation relative to one another, with at least one diamine which is capable of a transmidization reaction upon incorporation into the polyimide backbone, and with at least one other diamine which is not capable of undergoing such reaction, the diamine which is capable of undergoing the transimidization reaction being present in an amount of from about 1–50 mole percent in relation to the diamine that is not susceptable to transimidization.

18 Claims, 3 Drawing Sheets

THERMOPLASTIC COPOLYIMIDES AND COMPOSITES THEREFROM

This invention was made with Government support under contract NAG-1-448 and NAG-1-779 awarded by NASA. The Government has certain rights in this invention.

TECHNICAL FIELD OF THE INVENTION

The present invention relates to novel copolyimide compositions, copolyimide precursors and methods for their preparation which are melt-processible at relative low pressures, i.e. less than 1000 psi, and are suited for laminating and molding. The invention additionally encompasses reinforced polyimide composites and laminates made from said polyimides where the composite is reinforced by fibrous materials such as carbon fibers or Kevlar ® and processes for their manufacture.

BACKGROUND OF THE INVENTION

Polyimides are useful as components which require excellent thermal, electrical and/or mechanical properties. For general discussion of polyimides preparation, characterization and applications see *Polyimides, Synthesis, Characterization and Applications*, K. L. Mittal, ed Plenum, N.Y. 1984.

Polyimides based on pyromellitic dianhydride and various organic diamines are disclosed in U.S. Pat. No. 4,485,140 to Gannett et al (E. I. DuPont de Nemours and Co.).

Polyimides based on diamines such as 2,2'-di-(p-aminophenyloxy)diphenyl and various dianhydrides are disclosed in U.S. Pat. No. 4,239,880 to Darms (Ciba-Geigy Corp.).

Harris et al. in U.S. patent application Ser. No. 07/315,327, has disclosed the preparation of soluble polyimides based on polyphenylated diamines. The polyimides taught in this reference are typically rod like polyimides and possess little if any thermoplastic properties.

Numerous patents deal with the manufacture of composites utilizing carbon fibers or other similar fibrous reinforcing agent with polyimides.

In U.S. Pat. No. 4,851,280, Gupta teaches the use of carbon fiber reinforced polyimide composites for fabricating tools. Gupta teaches the use of a different class of polyimides than those employed in the present invention.

In U.S. Pat. No. 4,395,514, Edelman teaches a process for the preparation of polyimide composites including carbon fiber reinforced polyimide composites. The main thrust of the Edelman patent is the use of a class of cyclic peroxyketal catalysts. Edelman teaches the use of divalent aryl radicals.

In U.S. Pat. No. 4,578,470, Webb teaches that transimidization can be used as a mode of propagation in the preparation of polyimides. However, the use of transimidization to aid in the processing of copolyimides is not disclosed. Diamines that undergo transimidization are also not disclosed. In Webb, transimidization only occurs at the growing chain ends.

None of the above composite patents teach or insinuate that the copolyimides or copolyimide composites of the present invention would have the unusual properties necessary.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

SUMMARY OF THE INVENTION

We have discovered that a desirable new class of copolyimide compositions can be prepared by reacting at least one dianhydride or dianhydride derivative with at least two different diaryl diamines. These thermoplastic copolyimides and reinforced copolyimide molecular or laminate composites have high fracture resistance, outstanding modulus, tensile, excellent oxidative stability, excellent energy absorption characteristics, very low coefficient of expansion, excellent thermal stability, excellent dielectric properties at less expense than most existing polymers. These properties will make the polyimides and polyimide components ideally suited for use in the production of high performance compositions.

It is an object of this invention to provide melt-processible copolyimides based on two diamines having different basicity constants and at least one dianhydride or polymerizable equivalent thereof.

A further aspect of this invention is to provide copolyimides comprising repeat units based on at least two diamines and one or more dianhydrides.

A further aspect of this invention is to provide copolyimides comprising repeat units based on at least two diamines and one or more dianhydrides.

A further aspect of this invention is to provide copolyimides wherein one of the diamines is capable of undergoing a transimidization reaction while the other diamine is not capable of the same reaction.

A further object of this invention to provide copolyimides and/or copolyimide molecular composites where the polyimides are coated onto a reinforcing agent which may be a rigid fiber or fibrous material such as carbon fibers, Kevlar TM fibers and the like or other fibers.

Yet still another aspect of this invention is to prepare copolyimides where up to 50 mole percent of the copolyimide's diamine components are less reactive diamines, in particular aromatic heterocyclic diamines, that can undergo a transimidization exchange reaction.

DETAILED DESCRIPTION OF THE INVENTION

The polycondensation reaction of a dianhydride with a diamine to form a homopolyimide is well-known. However, these polyimides suffer from the fact that they are melt-processable only at high pressures, which has limited their field of use. In this invention, the polycondensation reaction of at least one dianhydride of formula (I)

(I)

where Z is a tetravalent organic radical selected from the group consisting of a carbocyclic-aromatic containing radical and a hetero-cyclic aromatic containing radical where each anhydride group is located on an aromatic ring with the carbonyl units in an ortho orientation relative to one another, and at least two diamines, a first diamine of formula (II)

$H_2N-Q-NH_2$ (II)

and a second diamine of formula (III)

$H_2N-Q'-NH_2$ (III)

where Q is divalent organic radical selected independently from the group consisting of a carbocyclic aliphatic radical, a carbocyclic aromatic containing radical, and a heterocyclic containing radical, the term carbocyclic aromatic containing radical and heterocyclic aromatic containing radical used to define Q includes any radical which has the anhydride groups attached to one or more aromatic ring(s) and has the amine groups attached to one or more aromatic ring(s), and where Q' is a highly electron-deficient divalent heterocyclic group having a 5- or 6-membered aromatic ring containing from 1-3 heteroatoms on the substituted or unsubstituted ring, at least one of the heteroatoms being nitrogen, and the others, if present are nitrogen or sulfur. In a preferred embodiment, the 5-6 membered aromatic ring contains 1-2 heteroatoms. While the rings are usually unsubstituted, they may be substituted, particularly with halogens.

The critical distinction between the diamines of formula (II) and those of formula (III) are that one diamine must be capable of undergoing a transimidization exchange reaction upon incorporation into the polyamide backbone, while the other diamine is not capable of the same reaction.

In preparing the above polyamides, a mixture of diamines of formula (II) and formula (III) are reacted with a mixture of one or more dianhydrides of formula (I) or ester derivatives of dianhydrides of formula (I). The combined molar amounts of the two diamines and dianhydride or dianhydride derivative, should be close to a one to one molar mixture. However, 10% excess of either component is acceptable. Once the polymerization has been completed, the last component to react will determine the polymer end group. The polymer end groups can, thus, be an amino group, an anhydride group or a mixture thereof.

Alternately, a chain termination or limiting reagent can be added to the polymerization mixture to force termination of a growing polymer chain. Such chain termination or limiting reagents are used to limit the molecular weight of the polymer and are well known in the art. Amine termination reagents commonly employed include aniline or substituted anilines. Common carboxy terminating reagents include phthalic anhydride and other similar aromatic anhydrides.

Without being limited to the following list, in that the examples are for purposes of illustrating members of the type of dianhydrides of formula (I) are selected from the representative and illustrative group consisting of: pyromellitic acid dianhydride, 3,6-diphenylpyromellitic dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, 3,3',4,4'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(2,3-dicarboxyphenyl)propane dianhydride, bis(3,4-dicarboxyphenyl) ether dianhydride, bis(3,4-dicarboxyphenyl)sulfone dianhydride, N,N-(3,4-dicarboxyphenyl)-N-methylamine dianhydride, bis(3,4-dicarboxyphenyl)diethylsilane dianhydride, 2,2-bis(3,4-dicarboxyphenyl)-1,1,1,3,3,3-hexafluoropropane dianhydride, 4,4'-[4,4'-isopropylidenedi(p-phenyleneoxy)]bis(phthalic anhydride) which is derived from the General Electric bis-phenol A TM, 2,3,6,7- and 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride as well as esters of the above listed compounds.

Without being limited to the following list, in that the examples are for purposes of illustrating members of the type of diamines which are susceptible to transimidization reaction, i.e., typically possessing base dissociation constants of less than $10^{-10}$, include: 2,6-diaminopyridine, 2,5-diaminopyridine, 2,4-diamino-6-hydroxypyrimidine, 2,4-diaminopyrimidine, 3,5-diamino-1,2,4-triazole, 4-chloro-2,6-diaminopyrimidine, 2,4-diamino-s-triazine, and 2-chloro-4,6-diaminotriazine, and 6,6'-diamino-2,2'-bipyridine.

Similarly, examples of the type of diamines which do not undergo transimidization reaction, i.e., typically with base dissociation constants greater than $10^{-10}$ include: 1,4-diaminobenzene, 1,3-diaminobenzene, 4,4'-diaminodiphenyl ether, 3,4'-diaminodiphenyl ether, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(4-aminophenoxy)-1,1'-biphenyl, 4,4'-bis(3-aminophenoxy)-1,1'-biphenyl, 2,2'-bis(trifluoromethyl)-4,4'-diamino-1,1'-biphenyl, 1,3-bis(4-aminophenoxy)-2,2-dimethylpropane, 1,3-bis(4-aminophenoxy)-2,2-diethylpropane, 1,2-bis(3-aminophenoxy)ethane, 1,2-bis(4-aminophenoxy)ethane, bis[2-(4-aminophenoxy)ethyl]ether, bis[2-(3-aminophenoxy)ethyl]ether, bis{2-[2-(4-aminophenoxy)ethoxy]ethyl}ether, 1,2-bis[2-(4-aminophenoxy)ethoxy]ethane, 1,3-bis(4-aminophenoxy-4'-benzoyl)benzene, 1,4-bis(4-aminophenoxy-4'-benzoyl)benzene, 4,4'-bis(4-aminophenoxy-4'-benzoyl)benzophenone, 4,4'-bis(4-aminophenoxy-4'-benzoyl)diphenylether, and 1,4-bis(4-aminophenoxy)-2-phenylbenzene.

The polycondensation reaction of the diamines of formulas (II) and (III) with one or more polycarboxy compounds of formula (I) is carried out in a manner which is itself known. When the polyimides are prepared through the polyamide-acid precursor, then the polycondensation reaction or polymerization reaction can be carried out at temperatures from about $-50°$ C. to $+300°$ C. The reaction can be carried out in the melt if the components are meltable within the above stated temperature range or, preferably, in an inert organic solvent or a solvent mixture. For the preparation of polyamide-acids of the present invention, temperatures from 40° C. to 100° C. are preferred. When the neat polyimide is desired, then the reaction is carried out in the presence of a solvent in the temperature range from about 150° C. to about 325° C. This temperature range results in the direct formation of the polyimide during preparation and no subsequent imidization reaction, be it thermal or chemical, is normally needed. When preparing a prepreg, the polyamide-acid precursor is polymerized in the presence of a solvent to a low to moderate molecular weight so that the polymer solution viscosity is from about 1,000 to 4,000 centipoise at a temperature from about 40° C. to about 100° C.

Examples of suitable organic solvents are: chlorinated aromatic hydrocarbons, such as chlorobenzene and dichlorobenzenes, chlorinated aliphatic hydrocarbons, such as methylene chloride, chloroform, tetrachloroethane and tetrachloroethylene, aliphatic and cycloaliphatic ketones, such as acetone, methyl ethyl ketone, cyclopentanone and cyclohexanone, cyclic ethers, such as tetrahydrofuran, tetrahydropyran and dioxane, cyclic amides, such as N-methyl-2-pyrrolidone, N-acetyl-2-pyrrolidone and N-methyl-a-caprolactam, N,N-dialkylamides of aliphatic monocarboxylic acids with 1-3 carbon atoms in the acid part, such as N,N-dimethylformamide, N,N-dimethylacetamide, N,N-diethylacetamide and N,N-dimethylmethoxyacetamide, hexamethylphosphoric acid triamide (hexametapol), N,N,N',N'-tetramethylurea, tetrahydrothiophene dioxide (sulfolane) and dialkylsulfoxides, such as dimethylsulfoxide and diethylsulfoxide.

Preferred solvents are N,N-dialkylamides of aliphatic monocarboxylic acids with 1-3 carbon atoms in the acid part, especially N,N-dimethylacetamide, as well as cyclic amides, such as N-methyl-2-pyrrolidone.

The condensation reactions are appropriately carried out with the exclusion of moisture, for example in an inert gas atmosphere, such as nitrogen.

Although polycarboxy compounds of formula (I) are shown in their dianhydride form, the esterified versions of these dianhydrides are also commonly used for the production of polyimide and are useful for polyimide formation using the diamines of formulas (II) and (III). The ester process normally does not go directly to the polyimide but stops at a polyamide intermediate. This intermediate can then be thermally or chemically imidized to form the desired polyimide. Use can also be made of the polycarboxylic acid derivative of compounds of formula (I). The tetracarboxylic acids react analogously to the acid esters, forming a polyamide acid which is imidized to a polyimide. Any and all of these methods, well known in the art, can be used for making polyimides according to the present invention.

The reaction of the dianhydrides or their ester derivatives of the formula (I) with the diamines of the formulas (II) and (III) can also be carried out stepwise, in order to manufacture intermediate polymers which, at least in part, have units of polyamide-acids and/or polyamide-esters. In these cases, the reaction is carried out in a manner which is itself known, using a slight excess of one or the other reactant in order to obtain prepolymers which have end groups suitable for further reaction, (i.e., amino end groups, acid chloride groups and/or anhydride groups).

The cyclization or imidization of the polyamide-acids obtained after the condensation reaction to polyimide is carried out in a manner, which is itself known, by chemical means or by means of heat. Two general methods are used.

The chemical cyclization or imidization is appropriately carried out by treatment with a dehydrating agent on its own or as a mixture with a tertiary amine. Reagents which can be used are, for example, acetic anhydride and propionic anhydride or mixtures of acetic anhydride, and pyridine or triethylamine or similar tertiary amine.

The thermal cyclization or imidization typically can be carried out in two different procedures. If a polyimide precursor, such as a polyamide-acid, is imidized in the absence of solvent, then the imidization temperature can range from about 200° C. to about 300° C. If the polyimide precursor is imidized in the presence of a solvent, as would be the case if the polyimide was to be prepared directly, then the imidization temperature can range from about 150° C. to about 250° C.

The polyimides according to the invention, as well as the corresponding molecular or laminate composites using them as the continuous phase, are suitable for the manufacture of shaped articles of very diverse types, such as fibers, films, sheets, coating, foams, laminates, molding powders, pressed articles and the like, in a manner which is itself known, if desired, with the use of customary additives, such as pigments, fillers and the like.

When the polyimides are used in laminate composites, they usually represent the continuous phase, with the laminate being reinforced by an organic fiber. Typical organic fibers used as reinforcing agents in laminate composites include, but are not limited to, carbon fiber, polyamides, polyesters, and other high tensile strength high performance organic fibers. However, inorganic and metallic fibers can also be used.

The composites of the present invention may be formed by any technique which is generally known in the art, including, but not limited to: compression molding, autoclaving, injecting molding and other similar techniques. One particularly preferred technique used in the present invention involves taking a fabric composed of the fibrous material that is to be the reinforcing agent, dipping it into a pre-impregnation dip containing a solution of a polyamide-acid and/or polyamide having low to moderate molecular weight so that the polymer solution viscosity will be in the range from about 1,000 to 4,000 centipoise (cp) and preferably from about 1,000 to 3,000 cp. The dip coats the fibers and fills the interstices between the fiber in the fabric. The prepreg step generally uses a lower molecular weight form of the polyimide precursor, polyamide-acid, followed by a subsequent thermal conditioning step of the entire composite to yield a fully polymerized and imidized, tough and durable laminate composite.

The laminate composites generally have from 4 to 40 layers of dipped fabric per composite. Typically the composite is made up of sets of smaller laminate composites consisting of from about 2 to about 6 dipped fabric layers with the orientation of the fabrics all in the same direction for the smaller laminate composite. However, composites with many layers of the same or differing orientation relative to one another can be prepared directly.

Figure 4:
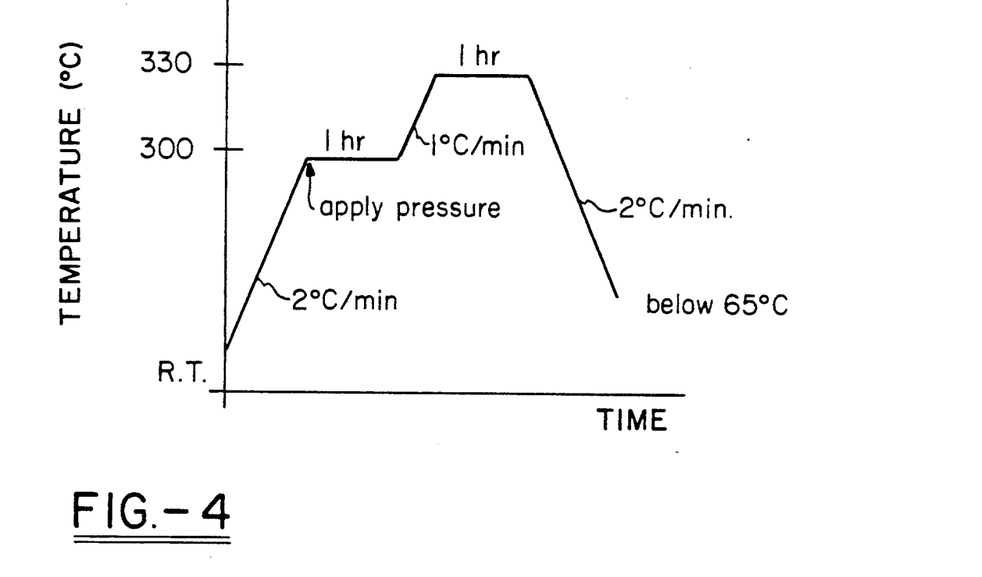
FIG. 4 illustrates a prepreg drying cycle showing a heating ramp under vacuum followed by a one hour hold at 250° C. followed by a rapid cooling ramp, still under vacuum.
Figure 5:
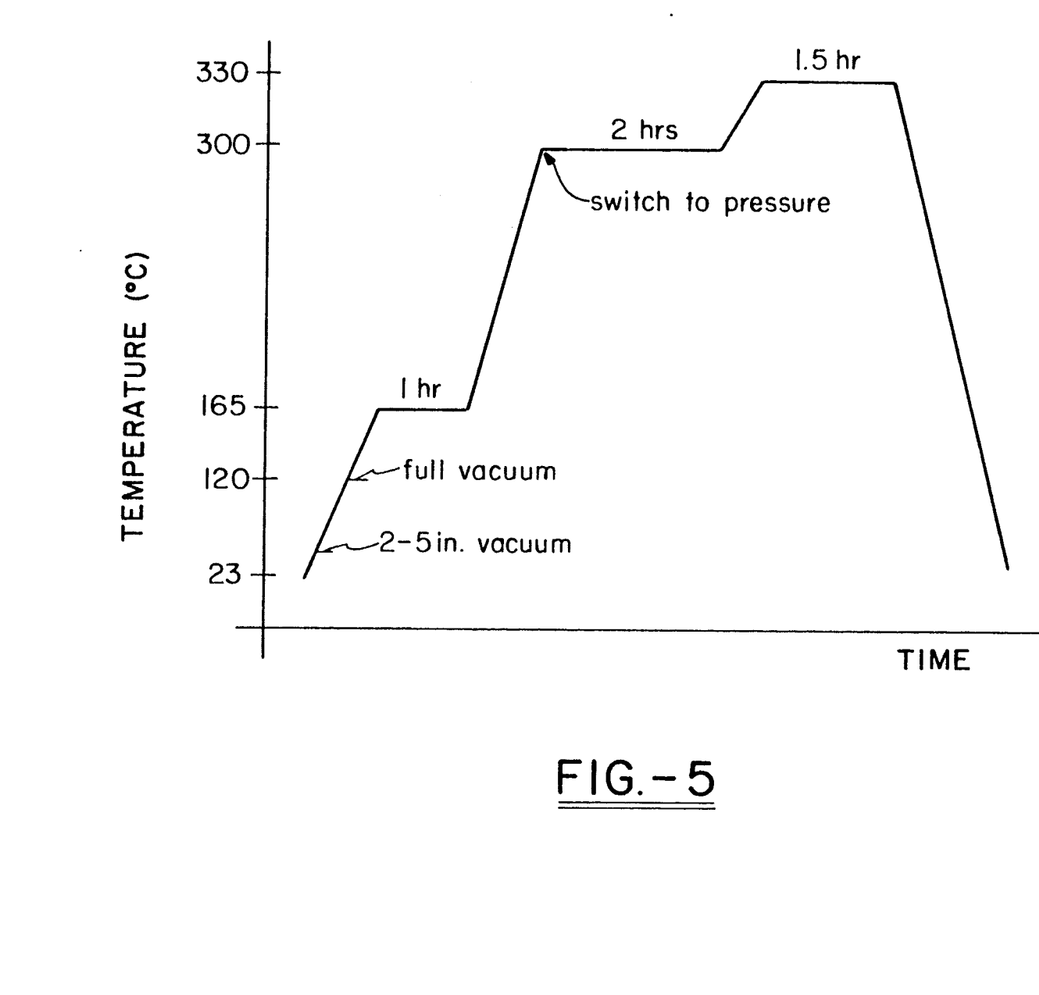
FIG. 5 illustrates a compression molding cycle showing a heating ramp at 2°/min. to 300° C., an hour hold under pressure, a second heating ramp at 1°/min., an hour hold still under pressure, followed by a 2°/min. cooling ramp under pressure to a temperature below 65° C.

For compression molding, the small laminate structures are dried in a drying cycle as shown in FIG. 4. After drying, the small composites are assembled into a larger composition where the larger composite can have from about 3 to 6 small components. The large composite can be structured in such a way as to have all the fabric running the same direction, i.e. anistropic, or all running in different directions to simulate an isotropic final structure. The large or small laminates can then be compression molded using a compression molding cycle similar to that shown in FIG. 5. The final temperature for curing is from about 300° C. to about 350° C.

Alternatively, the laminate structures can be placed in an autoclave and subjected to heat and pressure to affect laminate pretreatment. This is normally done at moderate temperatures from about room temperature to about 120° C. to about 250° C. and is meant as a mechanism for degassing the laminate layers and to increase the interpenetration of the dip coating on fabric layers so that a more uniform and stronger composite is obtained. The pretreated small laminates are then put together in a desired direction orientation of reinforcing fiber to obtain the desired final composition properties. Typically, the number of smaller composites that go into making the larger composite is between from about 3 to about 6 or 10.

The laminate structures can then be cured by autoclaving or compression molding which completes any imidization of polyimide precursors and/or completion of the polymerization of lower molecular weight polyimides to the thermoplastic polyimides. The final curing temperature is typically from about 250° C. to about 375° C. However, higher temperature may be used.

Composites obtained through these methods, or other methods for making composites using polyimide of this invention, are very tough and durable, show good thermal and structural integrity and have unusually high fracture energies, meaning that they are extremely resistant to impact fracturing and fatigue fractures.

The composites of this invention are derived from a polyimide having a relatively high $T_g$, a relatively small difference between $T_g$ and $T_m$, and thermoplastic properties. The composite comprises a polyimide or polyimide precursor and a reinforcing fiber, the precursor being characterized by the ability to be imidized to the polyimide. The polyimides are copolyimides which have some repeat units of both formulas (IV) and (V).

The fiber used to make the composites of the present invention can be selected from the representative and illustrative group consisting of carbon fibers and other carbonous fiber material, polyamide fibers, polyester fibers, polyimide fibers, cellulose fibers and cellulose derived fibers and other high strength fiber (viz., organic or inorganic) used in composites.

The present invention uses a prepreg dip step, followed by preconditioning of small laminate structures and a build up to larger laminate structures that are preconditioned and then autoclaved. Alternate techniques for the formation of laminate composites and molecular composites can be used and are well known in the art, including but not restricted to: compression molding, injection molding and other similar molding technology.

REACTIVE PLASTICIZER PROCESSING

Since the processing temperatures typically required for processing polyimide and/or polyimide laminates of the above-invention are typically higher than commercially desirable, one aspect of the invention is the application of a "reactive plasticizer approach" as an aid in the processing of the polyimide resins. This approach is especially useful in the reactive monomer technique used in the fabrication of fiber-reinforced composites. In particular, this approach allows polymers with $T_g$'s above 300° C. to be consolidated into laminates with autoclave pressures (150–250 psi). Such polymers cannot otherwise be processed at these low pressures.

By using this process, thermoplastic copolyimides can be melt-processed at relative low pressures of less than 1000 psi, and in a preferred mode of this invention, are melt-processed at pressures of 200–250 psi. These copolymers contain a repeat unit that is susceptible to transimidization exchange reactions in solution or in the melt. Due to the occurrence of the exchange reactions, the copolymers' molecular weight distribution approaches, and remains close to that predicted by statistics, commonly referred to as the "most probable distribution", as the copolymer is prepared and processed. Thus, the premature or inadvertent build-up of a few very high molecular weight chains in the copolymers' melts, that would greatly increase their viscosity is avoided. Furthermore, since chain growth can occur readily, due to the molecular mobility provided by the exchange reactions, lower molecular weight copolymers can be used in processing operations that require low pressure, such as autoclave processing, and then readily advanced to high molecular weight by simultaneous and subsequent heat treatments.

In this approach, up to 50 mole percent of the polyimide's diamine component is replaced with a much less-reactive diamine. The less-reactive diamine is designed to plasticize the growing polyimide chain during the fabrication process.

By using the reactive plasticizer approach, thermoplastic copolyimides, which have the properties of conventional polyimides, can be processed at relatively low pressures. The copolyimides contain an aromatic heterocyclic diamine, which is susceptible to transimidization upon incorporation into the polymer backbone, corresponding to diamines with a basicity constant of roughly less than $10^{-10}$ and in approximately 1-50 mole percent (more preferredly, from 5-20 mole percent), and one or more diamines completing the balance, with basicity constants greater than $10^{-10}$ that are not subject to transimidization. Such transimidization occurs at elevated temperatures with or without catalysts.

It is convenient to compare basicities of amines by measuring the extent to which they accept hydrogen from water. The equilibrium constant for this reaction is called a basicity constant, $K_b$.

$$K_b = \frac{[RNH_3^\oplus][OH^\ominus]}{[RNH_2]}$$

The larger the basicity constant, the stronger the base. Substituents on an aromatic ring of an amine can have a marked effect on the basicity of amines, p-nitroaniline for example, being only 1/4000 as basic as aniline. Amines are more basic than alcohols, ethers, esters, etc., for the same reason that ammonia is more basic than water. Nitrogen is less electronegative than oxygen, and can better accommodate the positive charge of the ion.

In general, the transimidization exchange reaction can be thought of as being typified by the following reaction sequence wherein R is a radical bonded to the nitrogen atom.

There is evidence that the unreactive diamines used are very susceptible to transimidization reactions. This means that even if they become incorporated in the growing polymer chain, they can be displaced by the more reactive diamine.

Thus, the copolymers will readily undergo transimidization exchange reactions at elevated temperatures in the repeat units containing the less-reactive diamine in solution or in the melt. Transimidization can be affected at a temperature in the range of about 100°–400° C., preferably about 225°–350° C. The rate of transimidization can be accelerated through the use of suitable catalysts, such as zinc acetate [Zn(OAc)$_2$.2H$_2$O], copper acetate [Cu(OAc)$_2$.2H$_2$O], cobalt acetate [Co(Oac)$_2$.4H$_2$O], or nickel acetate [Ni(OAc)$_2$.4H$_2$O]. Initially, these exchange reactions provide a means for decreasing the molecular weight of any high molecular weight chains in the copolymer which may have been inadvertently formed by diffusion-controlled kinetics early in their preparation.

The groups $R_1$, $R_2$ and $R_3$, refer to the growing polyimide backbone radicals.

The exchange reactions subsequently provide a means for enhancing molecular mobility as the viscosity of the polymerization medium increases as the polymerization progresses. This greatly reduces the tendency of the polymerization kinetics to become diffusion controlled in the latter stages of the polymerization. Thus, the premature formation of high molecular weight chains is avoided.

The exchange reaction actually has two potential reaction sites as shown below:

wherein $Z^2$, $Z^3$ and $Z^4$ are divalent organic radicals and are selected separately and independently from the group defining Q and Q' previously described and Z is a tetravalent organic radical also defined previously.

Conversely, the polymerization is also not terminated prematurely due to insufficient molecular mobility in the highly viscous medium. This is especially important in the processing of polymers with $T_g$'s above 300° C. Thus, the increase in molecular weight is gradual until very late in the polymerization and consistent with "reaction-controlled" kinetics. This means that the viscosity of the polymerization medium also increases gradually until late in the polymerization. This allows for considerable flow during processing.

In fact, it appears that such reactions may contribute to a narrowing of the polymer's final molecular weight distribution. Experimental results indicate that a very high molecular weight fraction in the distribution is not formed. This alone, may explain the significant enhancement in melt flow that is obtained by using this approach. Heterocyclic diamines work particularly well as "reactive plasticizers". In a most preferred embodiment, 2,6-diaminopyridine (DAP) has been found to dramatically improve the processability of a wide variety of polyimide resins. For example, the replacement of m-phenylene diamine and a portion of p-phenylene diamine with DAP in NR-150®, commercially available from the E.I. duPont de Nemours Co., significantly enhances its processability. The incorporation of 13 mole percent results in a formulation that is autoclavable. It is now possible to produce 32 ply laminates using an autoclave process that has reproducible properties. The glass transition temperature of the modified NR-150® is essentially identical to that of a standard formulation, which cannot be processed by autoclave techniques.

Another advantage of these copolyimides is that their structure changes from a more-or-less random arrangement of repeat units to one in which similar repeat units are arranged in blocks during processing. The random arrangement can disrupt the early development of crystallinity, thus facilitating processing at lower temperatures.

As the copolyimides are heated, the repeat unit containing the less-reactive diamine undergoes transimidization exchange reactions with unreacted amine chain ends. Transimidization, however, does not occur in the repeat units containing the more reactive diamines. Thus, the repeat units containing the less reactive diamine are gradually displaced allowing the formation of blocks of the repeat units containing the more-reactive diamine. Of course, blocks of the repeat units containing the less-reactive diamine are also formed in this process. In some cases, either one or both of the newly created blocks may crystalize.

If one or both of the blocks, crystallizes, phase separation can occur. In some cases, even though both blocks remain amorphous, phase separation may occur because of differences in the chemical structure of the blocks. Such phase separation may result in a copolymer that displays two glass transition temperatures, or in the case where both blocks are crystalline, two melting points. This behavior can result in a considerably higher use temperature than would be possible if the two blocks remained miscible.

In one method of preparing the novel copolyimides, the dianhydride is treated with an alcohol to form an alkyl diester. The dianhydride derivative is then dissolved in a solution containing the diamines. Suitable solvents include N,N'-dimethylformamide (DMF), N,N'-dimethylacetamide (DMAc), N-methyl pyrrolidinone (NMP), tetrahydrofuran (THF), alcohols, and mixtures thereof. The solution is heated to 60°–100° C. to effect reaction between the dianhydride derivative and the diamines until the solution viscosity reaches 1000–3000 centipoise when the solids concentration is 80–85% (w/v).

Alternatively, the dianhydride derivative could be reacted with the less-reactive diamine and then with the more reactive diamine to afford the viscous solution. This oligomer solution is then used to coat a substrate, such as a carbon fiber. In the preparation of fiber-reinforced composites, continuous fiber is coated to form a prepreg. This coated material is then heated to elevated temperatures to remove the solvent and to effect future polymerization.

The invention will be better understood by reference to the following examples which are included for purposes of illustration and not limitation. The following terms which are used throughout the examples and claims have the following definitions: g—gram(s), mol—mole(s), ml—milliliter, L—liter(s)

PREPARATION OF RANDOM OLIGOMERS (PREPREG SOLUTIONS)

EXAMPLE 1

3,3',4,4'-Benzophenonetetracarboxylic dianhydride (BTDA) (57.0992 g, 0.1772 mol) was placed in a 1 L resin kettle equipped with a mechanical stirrer, nitrogen inlet and a condenser. Methanol (15.7 ml, 12.4 g, 0.39 mol) and N-methylpyrrolidinone (NMP) (19.2 ml) were added, and the kettle lowered into an oil bath preheated to 78° C. The mixture was stirred under nitrogen for 1 hour at 75° C.±5° C. to form the dimethylester of BTDA (i.e., BTDE).

1,3-Bis(4-aminophenoxy)-2,2-dimethylpropane (DAPDP) (44.1301 g, 0.1541 mol) and 2,6-diaminopyridine (DAP) (2.5225 g, 0.0231 mol) were placed in a 250 ml, round-bottom flask along with tetrahydrofuran (THF) (50–70 ml) and heated to 75° C.±5° C. under nitrogen until all the solids dissolved (~20 min). This solution was added to the freshly prepared solution of BTDE, and the resulting mixture was stirred and heated at 75° C.±5° C. for 2 hours. The viscosity of the mixture was then adjusted, if necessary, to 1000 to 3000 centipoise as measured on a Brookfield viscometer, by the addition or removal of THF by distillation under reduced pressure.

EXAMPLE 2

The procedure described in Example 1 was repeated using the following amounts of reagents and solvents: BTDA (52.4591 g, 0.1628 mol); NMP (17.6 ml); methanol (14.4 ml); DAPDP (42.3832 g, 0.1480 ml); DAP (1.6151 g, 0.0148 mol); THF (43 ml).

EXAMPLE 3

The procedure described in Example 1 was repeated using the following amounts of reagents and solvents: BTDA (2.8356 g, 0.0088 mol); NMP (1.1 ml); methanol (0.90 ml); DAPDP (2.3963 g, 0.0084 mol); DAP (0.0457 g, 0.0004 mol); THF (5 ml).

EXAMPLE 4

The procedure described in Example 1 was repeated by replacing DAP with 2-chloro-4,6-diaminotriazine and using the following amounts of reagents and solvents: BTDA (52.4591 g, 0.1628 mol); NMP (16.0 ml); methanol (12.9 ml); DAPDP (40.5504 g, 0.1416 mol); 2-chloro-4,6-diaminotriazine (3.0856 g, 0.0212 mol); THF (60–80 ml).

EXAMPLE 5

The procedure described in Example 1 was repeated by replacing DAP with 3,5-diamino-1,2,4-triazole and using the following amounts of reagents and solvents: BTDA (47.9479 g, 0.1488 mol); NMP (15.0 ml); methanol (12.1 ml); DAPDP (37.0474 g, 0.1294 mol); 3,5-diamino-1,2,4-triazole (1.9224 g, 0.0194 mol); THF (50–70 ml).

EXAMPLE 6

BTDA (2.0600 g, 0.0064 mol) was added to a 100 ml resin kettle equipped with a mechanical stirrer and a reflux condenser. Methanol (6.0 ml) was added, and the slurry stirred and heated at reflux until a clear solution was obtained. DAPDP (1.6037 g, 0.0056 mol) and DAP (0.0873, 0.0008 mol) were added to the solution, which was then stirred and heated at reflux for 2 hours. Methanol was then added or removed by distillation until the solution viscosity was 1000 to 3000 centipoises.

EXAMPLE 7

The procedure described in Example 1 was repeated by replacing DAPDP with 1,3-bis(4-aminophenoxy-4'-benzoyl)benzene (BABB) and using the following amounts of reagents and solvents: BTDA (39.2476 g, 0.1218 mol); NMP (14.1 ml); methanol (10.8 ml); BABB (53.0233 g, 0.1059 mol); DAP (1.7340 g, 0.0159 mol); THF (120 ml).

EXAMPLE 8

2,2-Bis(2,3-dicarboxyphenyl)-1,1,1,3,3,3-hexafluoropropane dianhydride (6FDA) (72.4107 g, 0.1630 mol) was placed in a 500 ml resin kettle equipped with a mechanical stirrer, a nitrogen inlet and a condenser. Methanol (13.8 ml) and NMP (18.4 ml) were added, and the kettle was lowered into an oil bath preheated to 78° C. The mixture was stirred under nitrogen for 1 hour at 75° C.±5° C. to form the dimethylester of 6FDA (6FDE).

p-Phenylenediamine (PPDA) (15.3275 g, 0.1417 mol) and DAP (2.3200 g, 0.0213 mol) were stirred in NMP (10 ml) at 90°–100° C. until they dissolved, and then the solution was added to the 6FDE slurry. The solution was rinsed into the kettle with additional NMP (10 ml). After THF (50 ml) was added, the mixture was stirred and heated at 75° C.±5° C. for 2 hours. The viscosity of the final solution was then adjusted, if necessary, to 1000 to 3000 centipoise by the addition or removal of THF by distillation under reduced pressure.

EXAMPLE 9

The procedure described in Example 8 was repeated with the following amounts of reagents and solvents: 6FDA (62.0148 g, 0.1396 mol); NMP (15.8 ml); methanol (11.9 ml); DAP (1.3848 g, 0.0127 mol); PPDA (13.7217 g, 0.7269 mol); NMP (6.0 ml); THF (30.0 ml).

EXAMPLE 10

The procedure described in Example 8 was repeated with the following amounts of reagents and solvents: 6FDA (60.0158 g, 0.1351 mol); NMP (15.3 ml); methanol (11.5 ml); PPDA (13.9211 g, 0.1287 mol); DAP (0.7024 g, 0.0064 mol); NMP (6.1 ml); THF (30.5 ml).

EXAMPLE 10a 2,2-Bis[4-(3,4-dicarboxyphenoxy)phenyl]propane (BPADA) (2.5020 g, 0.0048 mol) was placed in a 50 ml resin kettle equipped with a mechanical stirrer, a nitrogen inlet, and a reflux condenser. After methanol (0.42 ml) and NMP (0.55 ml) were added, the kettle was lowered into an oil bath preheated to 78° C. The slurry was stirred at 75° C.±5° C. for 1 hour to generate the dimethyl ester of BPADA (BPADE). DAP (0.0655 g, 0.0006 mol) and m-phenylenediamine (0.4542 g, 0.0042 mol) were dissolved in hot THF (10 ml) and added to the BPADE slurry. The resulting mixture was stirred at 75° C.±5° C. for 2 hours.

IN-SITU POLYMERIZATION OF RANDOM OLIGOMERS (AUTOCLAVE PROCESSING)

EXAMPLE 11

Figure 1:
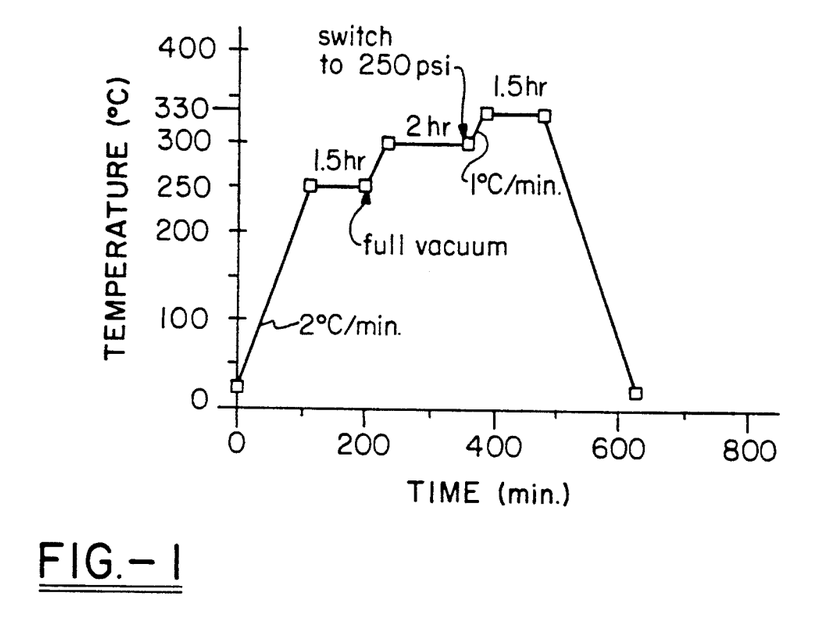
FIG. 1 illustrates an autoclave processing cycle for BTDA/DAPDP/DAP (1.0/0.85/0.15 molar ratios) showing an initial heating ramp taking the copolyimide to 250° C. with a 1.5 hour hold. During the heating, a vacuum is applied partially at first and fully about ¾ through the first heating ramp. After the 1.5 hour hold, a second heating ramp is applied raising the temperature to 300° C. Once 300° C. is attained, pressure is switched on (250 psi) and the temperature is held for two hours, followed by a third heating ramp to 330° C. holding for one and a half hours, followed by a cooling ramp back to ambient temperature.

The solutions described in Examples 1-6 were used to coat carbon fibers, for example T-40 12K, AS-4 or T-650, commercially available from Amoco and Hercules, at 60° C. on a Model-30 search Hot-Melt Prepregger. The coated fabric was allowed to dry in air overnight at room temperature. In some cases, 80-95% of the solvent was removed by further drying at elevated temperatures under reduced pressure. Four to 32 layers of prepreg fabric were layered on top of one another in any combination of orientations including one in which a fabric having the fibers in the same orientation was followed by a fabric with a set of fibers in another direction, followed by a fabric with a set of fibers in another direction, etc., to form a laminate composition where the fibers were oriented in different directions to allow the final composite to have more uniform properties. The laminates were then placed in an autoclave and subjected to the thermal, pressure cycle shown in FIG. 1. Typical properties of the composites obtained from the solution described in Example 1, and coated on T-650 were:

Flexural strength (3-point bend)=1181 MPa
Flexural Modulus (3-point bend)=102 GPa
Interlaminar Fracture Energy ($G_{Ic}$)=1.79 KJ/m²
Short Beam Shear Strength=99.7 MPa.

The composites were annealed at 275° C. for 24 hours and at 300° C. for 24 hours. Their flexural strength improved as shown below due to continued chain growth, which was facilitated by transimidization.

Flexural Strength after 24 h at 275° C.=1282 MPa
Flexural Strength after 24 h at 300° C.=1347 MPa
Flexural Modulus after 24 h at 275° C.=105.4 GPa
Flexural Modulus after 24 h at 300° C.=102.7 GPa.

EXAMPLE 12

Figure 2:
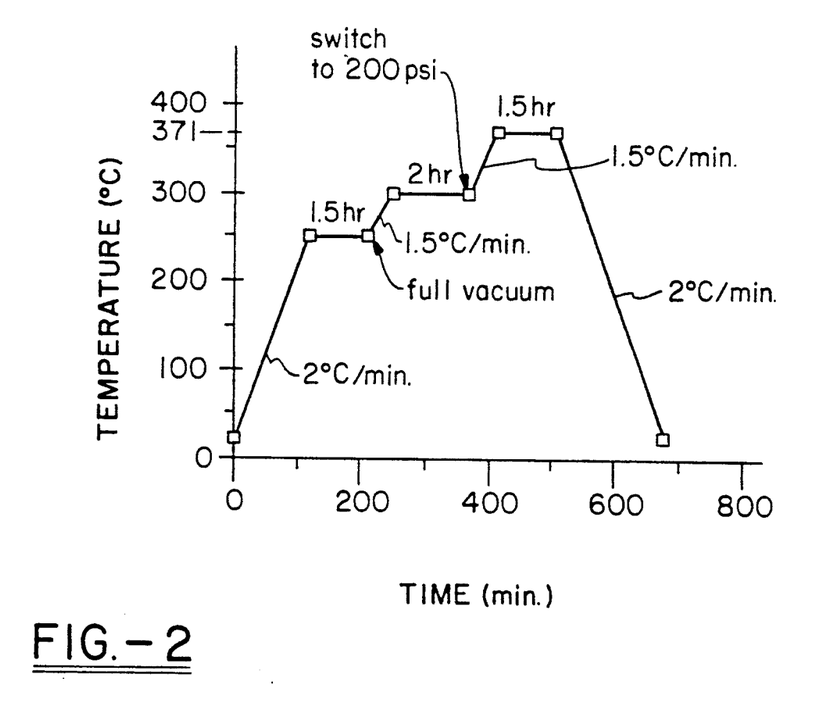
FIG. 2 illustrates an autoclave processing cycle for 6FDA/PPDA/DAP (1.0/0.85/0.15 molar ratios) showing an initial heating ramp taking the copolyimide to 250° C. with a 1.5 hour hold. During the heating, a vacuum is applied partially at first and fully about ¾ through the first heating ramp. After the 1.5 hour hold, a second heating ramp is applied raising the temperature to 300° C. Once 300° C. is attained, pressure is switched on (200 psi) and the temperature is held for two hours, followed by a third heating ramp to 371° C. holding for one and a half hours, followed by a cooling ramp back to ambient temperature.

The solutions described in Examples 7-10 were coated on carbon fibers that were made into laminates by the procedures described in Example 11. These laminates were placed in an autoclave and subjected to the thermal, pressure cycle shown in FIG. 2. Typical properties of the composites obtained from the solution described in Example 14 and T-650 fibers are shown below.

Flexural Strength (3-point bend)=1556 MPa
Flexural Modulus (3-point bend)=134.8 GPa
Interlaminar Fraction Energy ($G_{Ic}$)=1.54 KJ/m².

One of the composite samples was subsequently annealed at 350° C. for 2 hours and then at 400° C. for 4 hours. The $T_g$ of the resin increased from 355° C. to 388° C. during this time indicating that considerable chain growth occurred.

EXAMPLE 12

Figure 3:
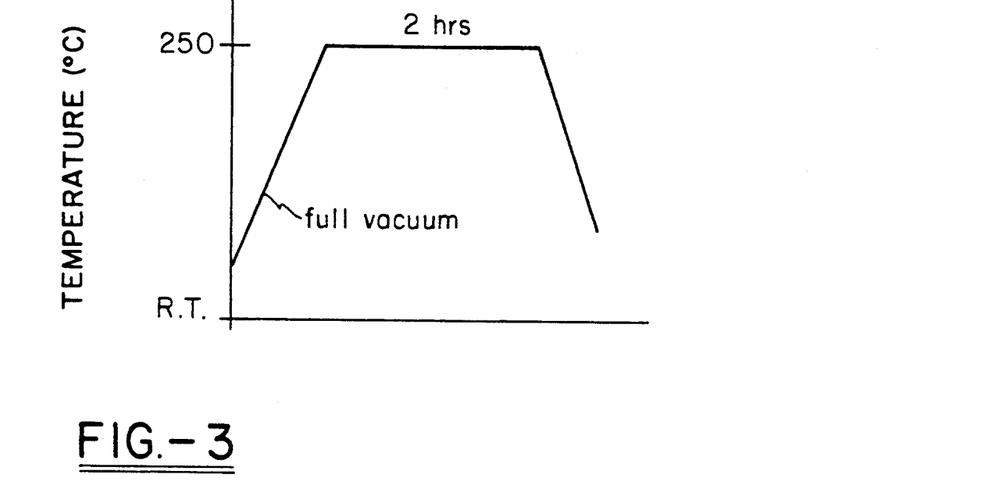
FIG. 3 illustrates a non-autoclave processing cycle for BPADA/MPDA/DAP (1.0/0.875/0.125) showing an initial heating ramp taking the copolyimide to 250° C. with a 1.0 hour hold. During the heating, a vacuum is applied partially at first and fully about ¾ through the first heating ramp. After the 1.0 hour hold, a second heating ramp is applied raising the temperature to 280° C. Once 280° C. is attained, the temperature is held for two hours, followed by a third heating ramp to 330° C. holding for one and a half hours, followed by a cooling ramp back to ambient temperature.

The solution obtained in Example 10a was placed in a 50 ml round-bottom flask equipped with a microdistillation setup. The flask was placed in a sand bath and subjected to the following heating/pressure cycle that mimicked the autoclave cycle used in Example 11 as shown in FIG. 3. During this cycle, the solvents were removed by distillation through the microdistillation setup. Samples were taken of the copolymer after 1 hour, 4.5 hours, and 7 hours, (points 1 through 3 respectively). Differential scanning calorimetry (DSC) analysis of these samples revealed that the copolymer after 1 hour had a single $T_g$ of 226° C. After 4.5 hours (point 2) the copolymer still had one $T_g$ near 224° C. After 7 hours (point 3) the copolymer had 2 $T_g$'s, one at 218° C. and another at 235° C. Thus, the random copolymer that formed initially rearranged via transimidization to form a block copolymer. The blocks partially phase separated to form separate domains. The $T_g$ at 218° C. is near the $T_g$ of a homopolymer of BPADA and MPDA ($T_g$=220° C.). The second $T_g$ at 235° C. can be attributed to the DAP/BPADA block. When the copolyimide was heated to 350° C. and then rapidly cooled (quenched), it displayed only one broad $T_g$ near 224° C. This indicates that the phases mixed on heating and were unable to phase separate on rapid cooling.

PREPARATION OF RANDOM COPOLYIMIDES

EXAMPLE 13

DAPDP (4.1089 g, 0.0143 mol) and DAP (0.2449 g, 0.0022 mol) were dissolved in NMP (55.0 g, 54 ml). BTDA (5.3168 g, 0.0165 mol) was then added, and the reaction mixture was stirred at room temperature for 18-24 hours. Pyridine (2.61 g, 2.70 ml) and acetic anhydride (3.33 g, 3.07 ml, 0.033 mol) were added, and the solution was stirred an additional 12-20 hours at room temperature. The solution was then added to isopropanol. The random copolymer that precipitated was collected by filtration and dried at 100° C. for 2 hours and at 250° C. for 2 hours. The inherent viscosity of the copolymer in NMP with a concentration of 0.5 g/dL at 30° C.±0.1° C. ranged from 0.5 to 1.0 dL/g. The random copolyimide was amorphous with a glass transition temperature ($T_g$) of 230°-240° C.

EXAMPLE 14

2,2-Bis[4-(3,4-dicarboxyphenoxy)phenyl]propane dianhydride (BPDAD) (0.5808 g, 0.0011 mol) was added to a solution of m-phenylenediamine (0.1038 g, 0.00096 mol) and DAP (0.0153 g, 0.00014 mol) in NMP (4.0 ml). The resulting mixture was stirred for 16-24 hours at room temperature. Pyridine (0.017 g, 0.18 ml, 0.0022 mol) and acetic anhydride (0.22 g, 0.21 ml, 0.0022 mol) were then added, and the mixture was stirred an additional 10-16 hours at room temperature. The solution was added to ethanol, and the random copolymer that precipitated was collected by filtration and dried at 100° C. for 2 hours and then at 250° C. for 2 hours. The inherent viscosity of the copolymer in NMP with a concentration of 0.5 g/dL at 30° C.±0.1° C. ranged from 0.3 to 0.8 dL/g. The random copolymer was amorphous with a single $T_g$ of 200°-215° C.

EXAMPLE 15

The procedure described in Example 14 was repeated with one modification. In this case, the BTDA was dissolved in NMP (27 ml) prior to being added to a solution of DAPDP and DAP in NMP (27 ml). The inherent of the copolymer prepared by this procedure ranged form 0.3-0.8 dL/g in NMP with a concentration of 0.5 g/dL at 30° C. ±0.1° C.

EXAMPLE 16

DAPDP (1.6579 g, 0.0058 mol), DAP (0.0948 g, 0.0009 mol) and BTDA (2.1493 g, 0.0067 mol) were placed in a 250 ml, 3-neck round-bottom flask equipped with a nitrogen inlet, a mechanical stirrer and a microdistillation setup. m-Cresol (22 ml) and isoquinoline (2-5 drops) were added, and the mixture heated to 190° C. ±10° C. under a rapid nitrogen purge for 4-10 hours. Under these conditions, the water of imidization was removed through the microdistillation head along with some m-cresol, which was replaced periodically. The copolymer was isolated by precipitation in methanol and dried at 100° C. for 2 hours and then at 250° C. for 2 hours.

COMPRESSION MOLDING OF RANDOM COPOLYIMIDES

EXAMPLE 17

The random copolyimide obtained in Example 13 was compression molded at 500-1000 psi and 330° C. The pressure and temperature were maintained for various periods of time. After a few minutes, the $T_g$ began to decrease and crystallinity began to develop as witnessed by differential scanning calorimetry (DSC) analysis of molded parts. The $T_g$ eventually fell to 220°-225° C. The degree of crystallinity that was obtained varied from 5-60 percent and depended on the molecular weight and the composition of the copolymer. Thus, the random amorphous copolymer underwent transimidization during the molding process to generate a block copolymer that crystallized and phase separated.

While in accordance with the patent statutes the best mode and preferred embodiment of the invention have been described, it is to be understood that the invention is not limited thereto, but rather is to be measured by the scope and spirit of the appended claims.

What is claimed is:

1. A process for improving the melt processibility of a thermoplastic copolyimide comprising the steps of:
   (a) reacting one or more of dianhydrides of formula (I)

where Z is a tetravalent organic radical selected from the group consisting of a carbocyclic-aromatic containing radical and a hetero-cyclic aromatic containing radical where each anhydride group is located on an aromatic ring with the carbonyl units in an ortho orientation relative to one another;

(b) adding at least one first diamine of formula (II) wherein the first diamine has a basicity constant of less than $10^{-10}$,

$$H_2N-Q-NH_2 \qquad (II)$$

and at least one second diamine of formula (III) wherein the second diamine has a basicity constant of at least $10^{-10}$,

$$H_2N-Q'-NH_2 \qquad (III)$$

where Q is divalent organic radical selected independently from the group consisting of a carbocyclic aliphatic radical, a carbocyclic aromatic containing radical, and a heterocyclic containing radical, the term carbocyclic aromatic containing radical and heterocyclic aromatic containing radical used to define Q includes any radical which has the anhydride groups attached to one or more aromatic ring(s) and has the amine groups attached to one or more aromatic ring(s), and where Q' is an electron-deficient divalent heterocyclic group having a 5- or a 6-membered ring containing from 1-3 heteroatoms, at least one of the heteroatoms being nitrogen and further wherein a first diamine is capable of a transimidization reaction upon incorporation into the polyimide backbone, and wherein a second diamine is not capable of undergoing a transimidization reaction upon incorporation into the polyimide backbone, the first diamine being added in an amount of about 1-50 mole percent in relation to the second diamine; and (c) forming from about 1-50 mole percent of a thermoplastic polyimide of repeating unit formula (IV), a balance of the thermoplastic polyimide of repeating unit formula (V),

(V)

the thermoplastic polyimide being melt processible at a pressure less than or equal to 250 psi, and capable of undergoing transimidization in the melt allowing for enhanced melt flow and the rearrangement of repeat unit sequences along the polymer backbone.

2. The process of claim 1 wherein a rate of transimidization is accelerated by a catalyst effective for the transimidization reaction.

3. A process for improving the melt processibility of a thermoplastic copolyimide comprising the steps of:

(a) reacting one or more of dianhydrides of formula (I)

(I)

where Z is a tetravalent organic radical selected from the group consisting of a carbocyclic aromatic containing radical and a heterocyclic aromatic containing radical where each anhydride group is located on an aromatic ring with the carbonyl units in an ortho orientation relative to one another with an alcohol to form a dialkyl diester;

(b) dissolving the dialkyl diester in a solvent containing at least one first diamine of formula (II) wherein the first diamine has a basicity constant of less than $10^{-10}$, $H_2N-Q-NH_2$ (II)

and at least one second diamine of formula (III) wherein the second diamine has a basicity constant of at least $10^{-10}$, $H_2N-Q'-NH_2$ (III)

where Q is divalent organic radical selected independently from the group consisting of a carbocyclic aliphatic radical, a carbocyclic aromatic containing radical, and a heterocyclic containing radical, the term carbocyclic aromatic containing radical and heterocyclic aromatic containing radical used to define Q includes any radical which has the anhydride groups attached to one or more aromatic ring(s) and has the amine groups attached to one or more aromatic ring(s), and where Q' is an electron-deficient divalent heterocyclic group having a 5- or a 6-membered ring containing from 1-3 heteroatoms, at least one of the heteroatoms being nitrogen and further wherein a first diamine is capable of a transimidization reaction upon incorporation into the polyimide backbone, and wherein a second diamine is not capable of undergoing a transimidization reaction upon incorporation into the polyimide backbone, the first diamine being added in an amount of about 1-50 mole percent in relation to the second diamine; and (c) heating until the dialkyl diester and the first and second diamines react thereby forming from about 1-50 mole percent of a thermoplastic polyimide of repeating unit formula (IV), (IV)

a balance of the thermoplastic polyimide of repeating unit formula (V),

(V)

the thermoplastic polyimide being melt processible at a pressure less than or equal to 250 psi, and capable of undergoing transimidization in the melt allowing for enhanced melt flow and the rearrangement of repeat unit sequences along the polymer backbone.

4. The process of claim 3 wherein the solvent is selected from the group consisting of N,N'-dimethylformamide, N,N'-dimethylacetamide, N-methylpyrrolidinone, tetrahydrofuran, alcohols and mixtures thereof.

5. A process for improving the melt processibility of a thermoplastic copolyimide having comprising the steps of:

(a) reacting one or more of dianhydrides of formula (I)

(I)

where Z is a tetravalent organic radical selected from the group consisting of a carbocyclic-aromatic containing radical and a hetero-cyclic aromatic containing radical where each anhydride group is located on an aromatic ring with the carbonyl units in an ortho orientation relative to one another with an alcohol to form a dialkyl diester;

(b) reacting the dialkyl diester with at least one first diamine of formula (II) wherein the first diamine has a basicity constant of less than $10^{-10}$, $H_2N-Q-NH_2$ (II)

in a solvent to form a precursor oligomer solution;

(c) reacting at least one second diamine of formula (III) wherein the second diamine has a basicity constant of at least $10^{-10}$, (III)

with the oligomer solution, where Q is divalent organic radical selected independently from the group consisting of a carbocyclic aliphatic radical, a carbocyclic aromatic containing radical, and a heterocyclic containing radical, the term carbocyclic aromatic containing radical and heterocyclic aromatic containing radical used to define Q includes any radical which has the anhydride groups attached to one or more aromatic ring(s), and has the amine groups attached to one or more aromatic ring(s), and where Q' is a highly electron-deficient divalent heterocyclic group having a 5- or a 6-membered ring containing from 1–3 heteroatoms, at least one of the heteroatoms being nitrogen and further wherein a first diamine is capable of a transimidization reaction upon incorporation into the polyimide backbone, and wherein a second diamine is not capable of undergoing a transimidization reaction upon incorporation into the polyimide backbone, the first diamine being added in an amount of about 1–50 mole percent in relation to the second diamine to form a viscous oligomer solution;

(d) coating the viscous solution on a substrate;

(e) drying the coated substrate to remove the solvent thereby forming from about 1–50 mole percent of a thermoplastic polyimide of repeating unit formula (IV), (IV)

a balance of the thermoplastic polyimide of repeating unit formula (V); and (V)

(f) consolidating the coated substrate in an autoclave by subjecting the substrate to a heating and pressure cycle wherein the pressure is less than or equal to 250 psi.

6. The process of claim 5 wherein the solvent is selected from the group consisting of N,N'-dimethylformamide, N,N'-dimethylacetamide, N-methylpyrrolidinone, tetrahydrofuran, alcohols and mixtures thereof.

7. The process of claim 5 wherein the substrate is selected from the group consisting of carbon fibers, polyamide fibers, polyester fibers, polyimide fibers, cellulose fibers, cellulose-derived fibers, inorganic fibers and metallic fibers.

8. The process of claim 7 wherein the substrate is a carbon fiber.

9. The process of claim 5 wherein a rate of transimidization is accelerated by a catalyst effective for the transimidization reaction.

10. A thermoplastic copolyimide melt-processable at a pressure less than or equal to 250 psi, comprising:

(a) from 1–50 mole percent of a thermoplastic polyimide of repeating unit formula (IV); and (IV)

(b) a balance of the thermoplastic polyimide of repeating unit formula (V)

(V)

wherein the thermoplastic copolyimide is the product of a reaction of one or more dianhydrides of formula (I)

(I)

where Z is a tetravalent organic radical selected from the group consisting of a carbocyclic-aromatic containing radical and a hetero-cyclic aromatic containing radical where each anhydride group is located on an aromatic ring with the carbonyl units in an ortho orientation relative to one another, with at least one first diamine of formula (II) wherein the first diamine has a basicity constant of less than $10^{-10}$, (II)

and at least one second diamine of formula (III) wherein the second diamine has a basicity constant of at least $10^{-10}$, (III)

where Q is divalent organic radical selected independently from the group consisting of a carbocyclic aliphatic radical, a carbocyclic aromatic containing radical, and a heterocyclic containing radical, the term carbocyclic aromatic containing radical and heterocyclic aromatic containing radical used to define Q includes any radical which has the anhydride groups attached to one or more aromatic ring(s) and has the amine groups attached to one or more aromatic ring(s), and where Q' is an electron-deficient divalent heterocyclic group having a 5- or a 6-membered ring containing from 1-3 heteroatoms, at least one of the heteroatoms being nitrogen and further wherein a first diamine is capable of a transimidization reaction upon incorporation into the polyimide backbone, and wherein a second diamine is not capable of undergoing a transimidization reaction upon incorporation into the polyimide backbone, the first diamine being added in an amount of about 1-50 mole percent in relation to the second diamine, and capable of undergoing transimidization in the melt allowing for enhanced melt flow and the rearrangement of repeat unit sequences along the polymer backbone.

11. The thermoplastic copolyimide of claim 10 wherein the first diamine is selected from the group consisting of 2,6-diaminopyridine, 2,5-diaminopyridine, 2,4-diamino-6-hydroxypyrimidine, 2,4-diaminopyrimidine, 3,5-diamino-1,2,4-triazole, 4-chloro-2,6-diaminopyrimidine,2,4-diamino-s-triazine, 2-chloro-4,6-diaminotriazine and 6,6'-diamino-2,2'-bipyridine and the second diamine is selected from the group consisting of 1,4-diaminobenzene, 1,3-diaminobenzene, 4,4'-diaminodiphenyl ether, 3,4'-diaminodiphenyl ether, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(4-aminophenoxy)-1,1'-biphenyl, 2,2'-bis(trifluoromethyl)-4,4'-diamino-1,1'-bipenyl, 1,3-bis(4-aminophenoxy)-2,2-dimethylpropane, 1,3-bis(4-aminophenoxy)-2,2-diethylpropane, 1,2-bis(3-aminophenoxy)ethane, 1,2-bis(4-aminophenoxy)ethane, bis[2-(4-aminophenoxy)ethyl]ether, bis[2-(3-aminophenoxy)ethyl]ether, bis{2-[2-(4-aminophenoxy)ethoxy]ethyl}ether, 1,2-bis[2-(4-aminophenoxy)ethoxy]ethane, 1,3-bis(4-aminophenoxy-4'-benzoyl)benzene, 1,4-bis(4-aminophenoxy-4'-benzoyl)benzene, 4,4'-bis(4-aminophenoxy-4'-benzoyl)benzophrnone, 4,4'-bis(4-aminophenoxy-4'-benzoyl)diphenylether, and 1,4-bis(4-aminophenoxy)-2-phenylbenzene.

12. The thermoplastic copolyimide of claim 10 wherein the dianhydride is selected from the group consisting of pyromellitic acid dianhydride, 3,6-diphenylpyromellitic dianhydride, 3,3', 4,4'-benzophenonetetracarboxylic acid dianhydride, 2,3,3',4'-benzophenonetetracarboxylic acid dianhydride, 2,2', 3,3'-benzophenonetetracarboxylic acid dianhydride, 3,3', 4,4'-biphenyltetracarboxylic acid dianhydride, bis(2,3-dicarboxyphenyl)-methane dianhydride, bis(2,5,6-trifluoro-3,4-dicarboxyphenyl)methane dianhydride, 2,2-bis(2,3-dicarboxyphenyl)propane dianhydride, bis(3,4-dicarboxyphenyl) ether dianhydride, bis(3,4-dicarboxyphenyl)-sulfone dianhydride, N,N-(3,4-dicarboxyphenyl)-N-methylamine dianhydride, bis(3,4-dicarboxyphenyl)diethylsilane dianhydride, 2,2-bis(3,4-dicarboxyphenyl)-1,1,1,3,3,3-hexafluoropropane dianhydride, 4,4'-[4,4'-isopropylidene-di(p-phenyleneoxy)]bis bis(phthalicanhydride), 2,3,6,7-naphthalene-tetracarboxylic acid dianhydride, 1,2,5,6-naphthalene-tetracarboxylic acid dianhydride, 2,6-dichloronaphthalene-1,4,5;8-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride as well as esters of the above listed compounds.

13. The thermoplastic copolyimide of claim 10 further comprising from 5-25 mole percent of a thermoplastic polyimide repeating unit of formula (IV) and the balance of the thermoplastic polyimide of repeating unit (V).

14. The thermoplastic copolyimide of claim 10 wherein the second diamine contains from 1-2 heteroatoms, the heteroatoms selected from the group consisting of nitrogen and sulfur.

15. The thermoplastic copolyimide of claim 14 wherein the second diamine contains at least one halogen substituent group on the aromatic rings.

16. A thermoplastic copolyimide having a $T_g$ greater than 300° C., melt-processable at a pressure less than or equal to 250 psi, comprising:
(a) from 1-50 mole percent of a thermoplastic polyimide of repeating unit formula (IV); and (b) a balance of the thermoplastic polyimide of repeating unit formula (V).

where Z is a tetravalent organic radical selected from the group consisting of a carbocyclic-aromatic containing radical and a hetero-cyclic aromatic containing radical where each anhydride group is located on an aromatic ring with the carbonyl units in an ortho orientation relative to one another, and where Q is divalent organic radical selected independently from the group consisting of a carbocyclic aliphatic radical, a carbocyclic aromatic containing radical, and a heterocyclic containing radical, the term carbocyclic aromatic containing radical and heterocyclic aromatic containing radical used to define Q includes any radical which has the anhydride groups attached to one or more aromatic ring(s) and has the amine groups attached to one or more aromatic ring(s), and where Q' is an electron-deficient divalent heterocyclic group having a 5- or a 6-membered ring containing from 1-3 heteroatoms, at least one of the heteroatoms being nitrogen.

17. The thermoplastic copolyimide of claim 16 further comprising from 5-25 mole percent of a thermoplastic polyimide repeating unit of formula (IV) and the balance of the thermoplastic polyimide of repeating unit (V).

18. The thermoplastic copolyimide of claim 16 wherein the second diamine contains from 1-2 heteroatoms, the heteroatoms selected from the group consisting of nitrogen and sulfur.

* * * * *